(12) United States Patent
Lemons

(10) Patent No.: US 8,073,701 B2
(45) Date of Patent: *Dec. 6, 2011

(54) METHOD AND APPARATUS FOR IDENTITY VERIFICATION USING VISUAL REPRESENTATION OF A SPOKEN WORD

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 898 days.

This patent is subject to a terminal disclaimer.

(21) Appl. No.: 12/148,585

(22) Filed: Apr. 21, 2008

(65) Prior Publication Data
US 2008/0275703 A1    Nov. 6, 2008

Related U.S. Application Data

(60) Provisional application No. 60/913,092, filed on Apr. 20, 2007.

(51) Int. Cl.
*G10L 17/00* (2006.01)
*G10L 21/06* (2006.01)
(52) U.S. Cl. .................. 704/273; 704/246; 704/276
(58) Field of Classification Search .................. None
See application file for complete search history.

(56) References Cited

U.S. PATENT DOCUMENTS

| | | | |
|---|---|---|---|
| 2,804,500 A | 8/1957 | Giacoletto |
| 3,698,277 A | 10/1972 | Barra |
| 3,969,972 A | 7/1976 | Bryant |
| 4,128,846 A | 12/1978 | Robinson |
| 4,172,406 A | 10/1979 | Martinez |
| 4,257,062 A | 3/1981 | Meredith |
| 4,378,466 A | 3/1983 | Esser |
| 4,526,168 A | 7/1985 | Hassler et al. |
| 4,887,507 A | 12/1989 | Shaw |
| 4,907,573 A | 3/1990 | Nagasaki |
| 5,048,390 A | 9/1991 | Adachi et al. |
| 5,207,214 A | 5/1993 | Romano |
| 5,370,539 A | 12/1994 | Dillard |
| 5,415,071 A | 5/1995 | Davies |
| 5,563,358 A | 10/1996 | Zimmerman |
| 5,741,990 A | 4/1998 | Davies |

(Continued)

FOREIGN PATENT DOCUMENTS
EP    0349686 A1    1/1990
(Continued)

OTHER PUBLICATIONS

"Time-line of the Music Animation Machine (and related experiments)", Music Animation Machine: History, htp://www.musenim.com/mam/mamhist.htm. pp. 1-5, p. 1, pp. 1-2, pp. 1-2 & p. 1, printed Aug. 30, 2007.

(Continued)

*Primary Examiner* — Talivaldis Ivars Smits
(74) *Attorney, Agent, or Firm* — Woodward, Emhardt, Moriarty, McNett & Henry LLP

(57) ABSTRACT

The present disclosure relates to identity verification devices and methods. A system is provided that utilizes a system of tonal and rhythmic visualization of a spoken word to accurately identify the true owner of a credit or other personal card based on their voice.

14 Claims, 17 Drawing Sheets
(11 of 17 Drawing Sheet(s) Filed in Color)

U.S. PATENT DOCUMENTS

| | | | |
|---|---|---|---|
| 5,784,096 | A | 7/1998 | Paist |
| 6,031,172 | A | 2/2000 | Papadopoulos |
| 6,111,755 | A | 8/2000 | Park |
| 6,127,616 | A | 10/2000 | Yu |
| 6,137,041 | A | 10/2000 | Nakano |
| 6,201,769 | B1 | 3/2001 | Lewis |
| 6,245,981 | B1 | 6/2001 | Smith |
| 6,265,651 | B1 | 7/2001 | Landtroop |
| 6,350,942 | B1 | 2/2002 | Thomson |
| 6,390,923 | B1 | 5/2002 | Yoshitomi et al. |
| 6,392,131 | B2 | 5/2002 | Boyer |
| 6,407,323 | B1 | 6/2002 | Karapetian |
| 6,411,289 | B1 | 6/2002 | Zimmerman |
| 6,414,230 | B2 | 7/2002 | Randall |
| 6,448,487 | B1 | 9/2002 | Smith |
| 6,544,123 | B1 | 4/2003 | Tanaka et al. |
| 6,686,529 | B2 | 2/2004 | Kim |
| 6,750,386 | B2 | 6/2004 | King |
| 6,791,568 | B2 | 9/2004 | Steinberg et al. |
| 6,841,724 | B2 | 1/2005 | George |
| 6,856,329 | B1 | 2/2005 | Peevers et al. |
| 6,927,331 | B2 | 8/2005 | Haase |
| 6,930,235 | B2 | 8/2005 | Sandborn et al. |
| 6,987,220 | B2 | 1/2006 | Holcombe |
| 7,030,307 | B2 | 4/2006 | Wedel |
| 7,096,154 | B1 | 8/2006 | Andrade-Cetto |
| 7,153,139 | B2 | 12/2006 | Wen et al. |
| 7,182,601 | B2 | 2/2007 | Donnan |
| 7,202,406 | B2 | 4/2007 | Coleman |
| 7,212,213 | B2 | 5/2007 | Steinberg et al. |
| 7,271,328 | B2 | 9/2007 | Pangrie |
| 7,271,329 | B2 | 9/2007 | Franzblau |
| 7,400,361 | B2 | 7/2008 | Noske et al. |
| 7,439,438 | B2 | 10/2008 | Hao |
| 7,521,619 | B2 | 4/2009 | Salter |
| 7,538,265 | B2 | 5/2009 | Lemons |
| 7,634,405 | B2 * | 12/2009 | Basu et al. ............... 704/243 |
| 7,663,043 | B2 | 2/2010 | Park |
| 7,667,125 | B2 | 2/2010 | Taub et al. |
| 7,714,222 | B2 | 5/2010 | Taub et al. |
| 2002/0050206 | A1 | 5/2002 | MacCutcheon |
| 2002/0176591 | A1 | 11/2002 | Sandborn et al. |
| 2003/0205124 | A1 | 11/2003 | Foote et al. |
| 2004/0089132 | A1 | 5/2004 | Georges et al. |
| 2004/0148575 | A1 | 7/2004 | Haase |
| 2004/0206225 | A1 | 10/2004 | Wedel |
| 2005/0190199 | A1 | 9/2005 | Brown et al. |
| 2005/0241465 | A1 | 11/2005 | Goto |
| 2006/0107819 | A1 | 5/2006 | Salter |
| 2006/0132714 | A1 | 6/2006 | Nease et al. |
| 2007/0044639 | A1 | 3/2007 | Farbood et al. |
| 2007/0157795 | A1 | 7/2007 | Hung |
| 2007/0180979 | A1 | 8/2007 | Rosenberg |
| 2008/0022842 | A1 | 1/2008 | Lemons |
| 2008/0034947 | A1 | 2/2008 | Sumita |
| 2008/0115656 | A1 | 5/2008 | Sumita |
| 2008/0190271 | A1 | 8/2008 | Taub et al. |
| 2008/0245212 | A1 | 10/2008 | Lemons |
| 2008/0264239 | A1 | 10/2008 | Lemons et al. |
| 2008/0271589 | A1 | 11/2008 | Lemons |
| 2008/0271590 | A1 | 11/2008 | Lemons |
| 2008/0271591 | A1 | 11/2008 | Lemons |
| 2008/0276790 | A1 | 11/2008 | Lemons |
| 2008/0276791 | A1 | 11/2008 | Lemons |
| 2008/0276793 | A1 | 11/2008 | Yamashita et al. |
| 2008/0314228 | A1 | 12/2008 | Dreyfuss et al. |
| 2009/0223348 | A1 | 9/2009 | Lemons |
| 2010/0154619 | A1 | 6/2010 | Taub et al. |

FOREIGN PATENT DOCUMENTS

| | | |
|---|---|---|
| EP | 0 456 860 A1 | 11/1991 |
| EP | 1345561 A1 | 10/2003 |
| EP | 1354561 A1 | 10/2003 |
| JP | 05-232856 | 9/1993 |
| JP | 2004-226556 A | 8/2004 |
| KR | 10-2006-0110988 | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/suraces_curyes/harmonograph/, pp. 1-6, printed Aug. 30, 2007.

Dunne, Gabriel, "Color/Shape/Sound Ratio & Symmetry Calculator," Quilime.com—Symmetry Calculator, https://www.quilime.com/content/colorcalc/, pp. 1-6, printed Jul. 3, 2007.

Patent Application Search Report mailed on Sep. 18, 2008 for PCT/US2008/005072.

Patent Application Search Report mailed on Sep. 18, 2008 for PCT/US2008/005124.

Patent Application Search Report mailed on Sep. 24, 2008 for PCT/US2008/005125.

Patent Application Search Report mailed on Sep. 29, 2008 for PCT/US2008/005074.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005069.

Patent Application Search Report mailed on Aug. 18, 2008 for PCT/US2008/005073.

Patent Application Search Report mailed on Aug. 18, 2008 for PCT/US2008/005126.

Patent Application Search Report mailed on Aug. 21, 2008 for PCT/US2008/005076.

Patent Application Search Report mailed on Aug. 27, 2008 for PCT/US2008/005075.

Patent Application Search Report Mailed on Aug. 28, 2008 for PCT/US2008/005077.

Patent Application Search Report mailed on Jul. 31, 2008 for PCT/US2008/005070.

Rabiner, Huang "Fundamentals of Speech Recognition," PTR Prentice-Hall, Inc., 1993, ISBN 0-13-285826-6, pp. 21-31, 46-68; Fig. 2.17, 2.32.

Patent Application Search Report mailed on Aug. 25, 2009 for PCT/US2009/000684.

Written Opinion mailed on Aug. 25, 2009 for PCT/US2009/00684.

* cited by examiner

METHOD AND APPARATUS FOR IDENTITY VERIFICATION USING VISUAL REPRESENTATION OF A SPOKEN WORD

CROSS-REFERENCE TO RELATED APPLICATIONS

The present application claims the benefit of U.S. Provisional Patent Application Ser. No. 60/913,092, filed Apr. 20, 2007, entitled "Method and Apparatus for Identity Verification." This application also relates to U.S. Provisional Patent Application Ser. No. 60/830,386 filed Jul. 12, 2006 entitled "Apparatus and Method for Visualizing Musical Notation", U.S. Utility patent application Ser. No. 11/827,264 filed Jul. 11, 2007 entitled "Apparatus and Method for Visualizing Music and Other Sounds", U.S. Provisional Patent Application Ser. No. 60/921,578, filed Apr. 3, 2007, entitled "Device and Method for Visualizing Musical Rhythmic Structures", and U.S. Utility patent application Ser. No. 12/023,375 filed Jan. 31, 2008 entitled "Device and Method for Visualizing Musical Rhythmic Structures". All of these applications are hereby incorporated by reference in their entirety.

TECHNICAL FIELD OF THE DISCLOSURE

The present disclosure relates generally to identity verification and, more specifically, to a system and method for identity verification using analysis of tonal and rhythmic structures of a person's voice.

BACKGROUND OF THE DISCLOSURE

Identity theft and credit card fraud are becoming huge liabilities for card issuers as well as creating many problems and potentially high costs for consumers whose identity is stolen. As yet, no reliable way to protect against credit card misuse has been developed. Methods and devices are needed that provide accurate and efficient identification of individuals in a cost-effective manner.

SUMMARY OF THE INVENTION

Accordingly, in one aspect, an identity verification system is disclosed, comprising: a sound input device, a processing device, and a display; wherein said processing device executes computer readable code to create a first visual representation of a spoken word sensed by the sound input device for output on the display; wherein said first visual representation is evaluated to determine the identity of the person speaking said spoken word; and wherein said first visual representation is generated according to a method comprising the steps of: (a) labeling the perimeter of a circle with a plurality of labels corresponding to a plurality of equally spaced frequency intervals in an octave, such that moving clockwise or counter-clockwise between adjacent ones of said labels represents a first frequency interval; (b) identifying an occurrence of a first frequency within the spoken word; (c) identifying an occurrence of a second frequency within the spoken word; (d) identifying a first label corresponding to the first frequency; (e) identifying a second label corresponding to the second frequency; (f) creating a first line connecting the first label and the second label.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
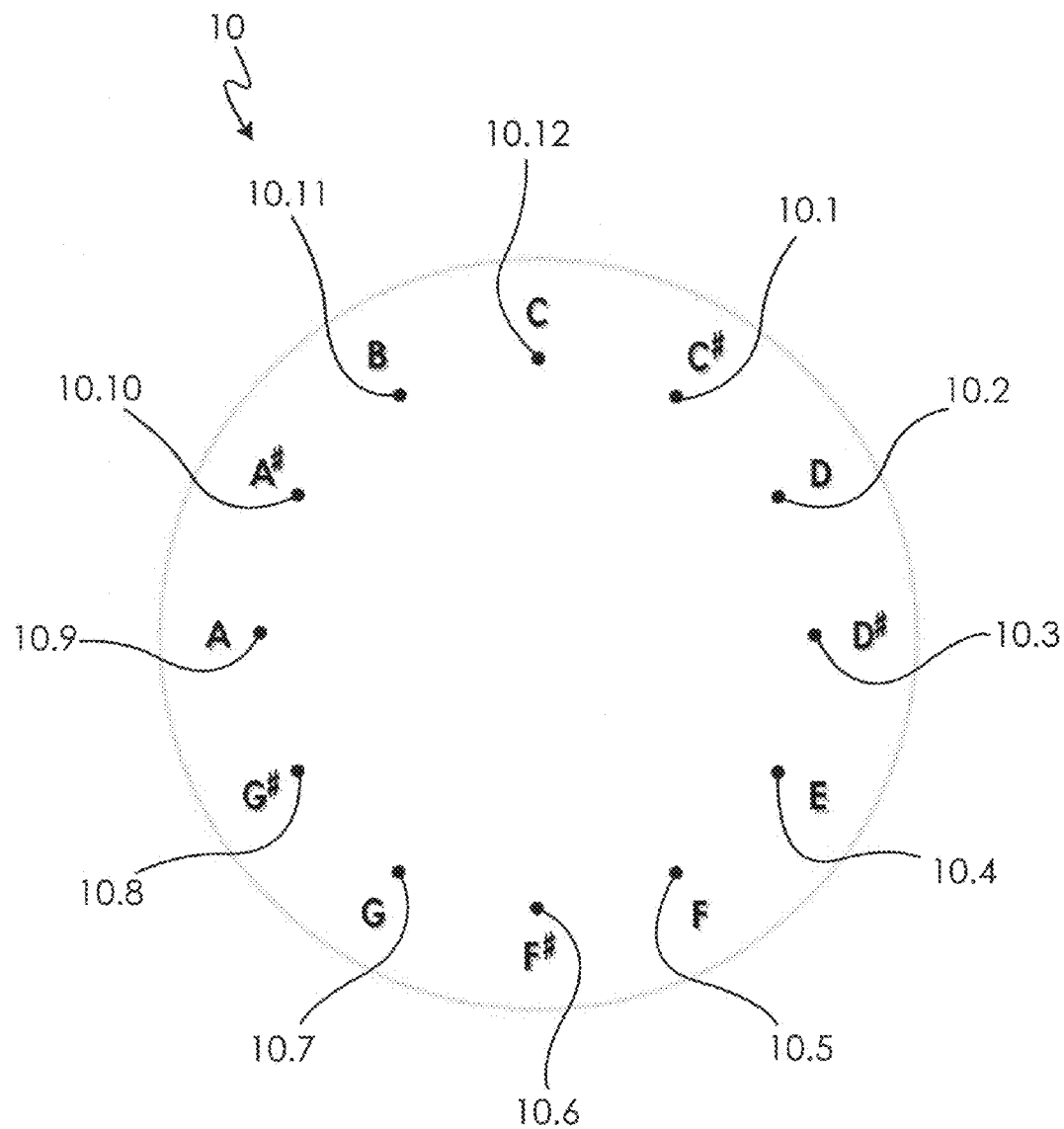
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the system and method for identity verification, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference in its entirety.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

| | |
|---|---|
| Major scale: | 2 steps, 2 steps, 1 step, 2 steps, 2 steps, 2 steps, 1 step |
| Harmonic Minor Scale: | 2, 1, 2, 2, 1, 3, 1 |
| Melodic Minor Scale: | 2, 1, 2, 2, 2, 2, 1 |

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (#'s) and 'flats' (b's) to cover the remaining five tones so that a single notation system can be used to encompass all three scales. For example, certain key signatures will have seven 'pure letter' tones (like 'A') in addition to sharp or flat tones (like $C^\#$ or $G^b$), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., $A^\#$ is the same as $B^{47}$), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
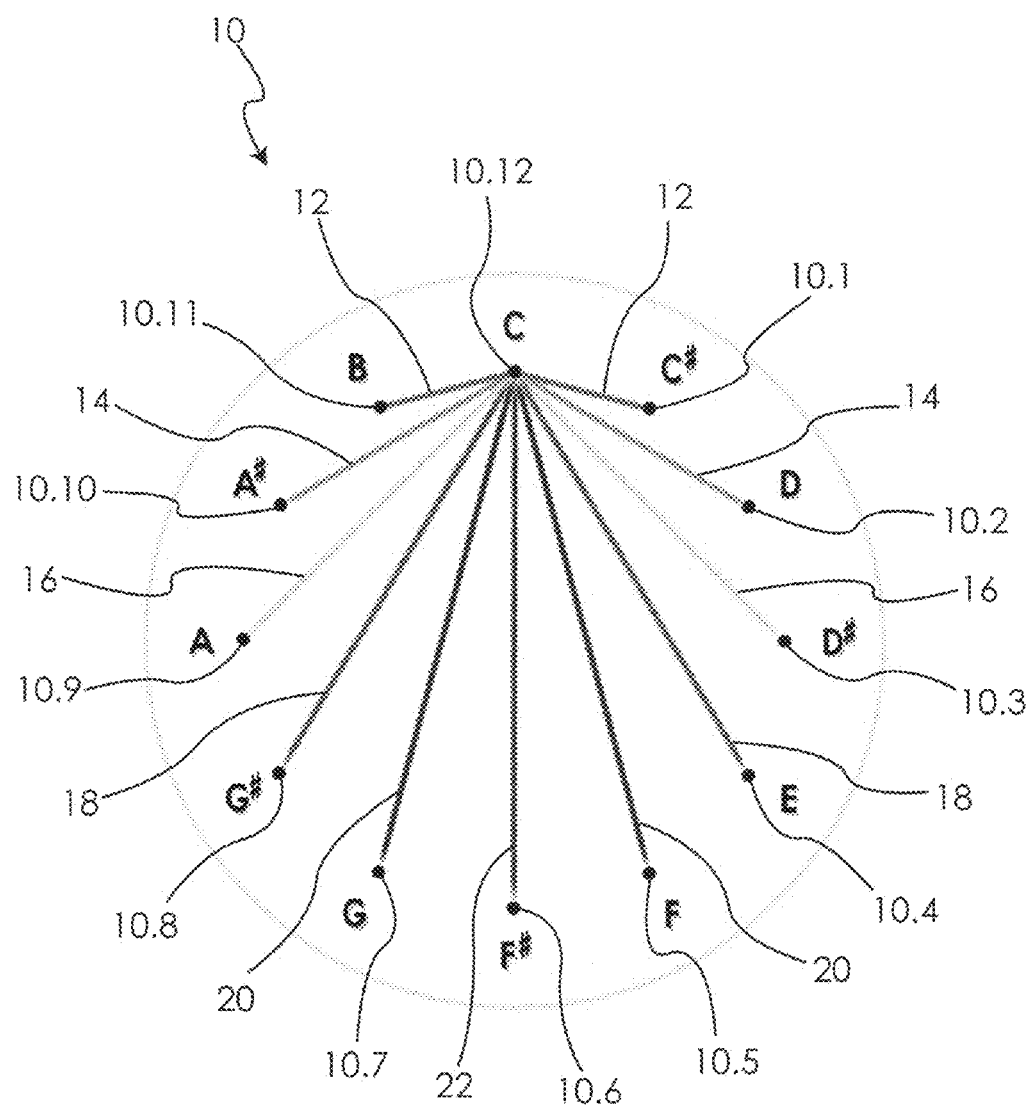
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and $A^\#$ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
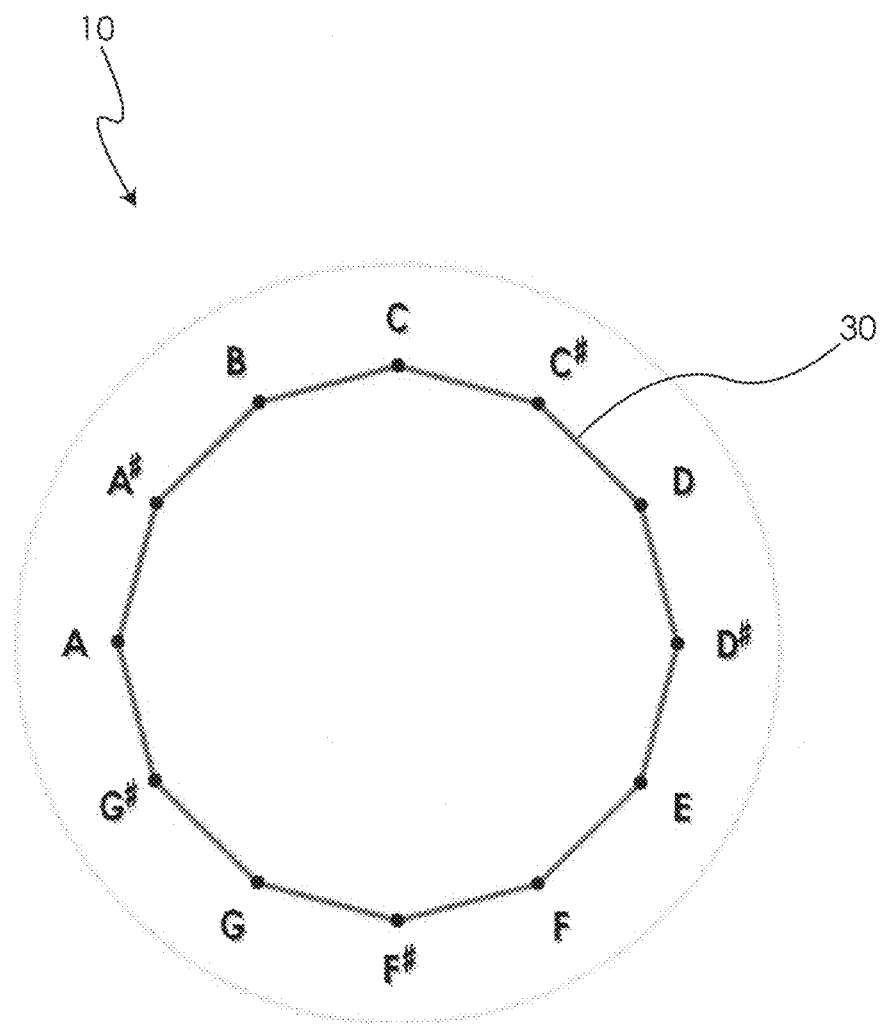
FIG. 3 is a diagram of a twelve-tone circle showing the chromatic scale.
Figure 4:
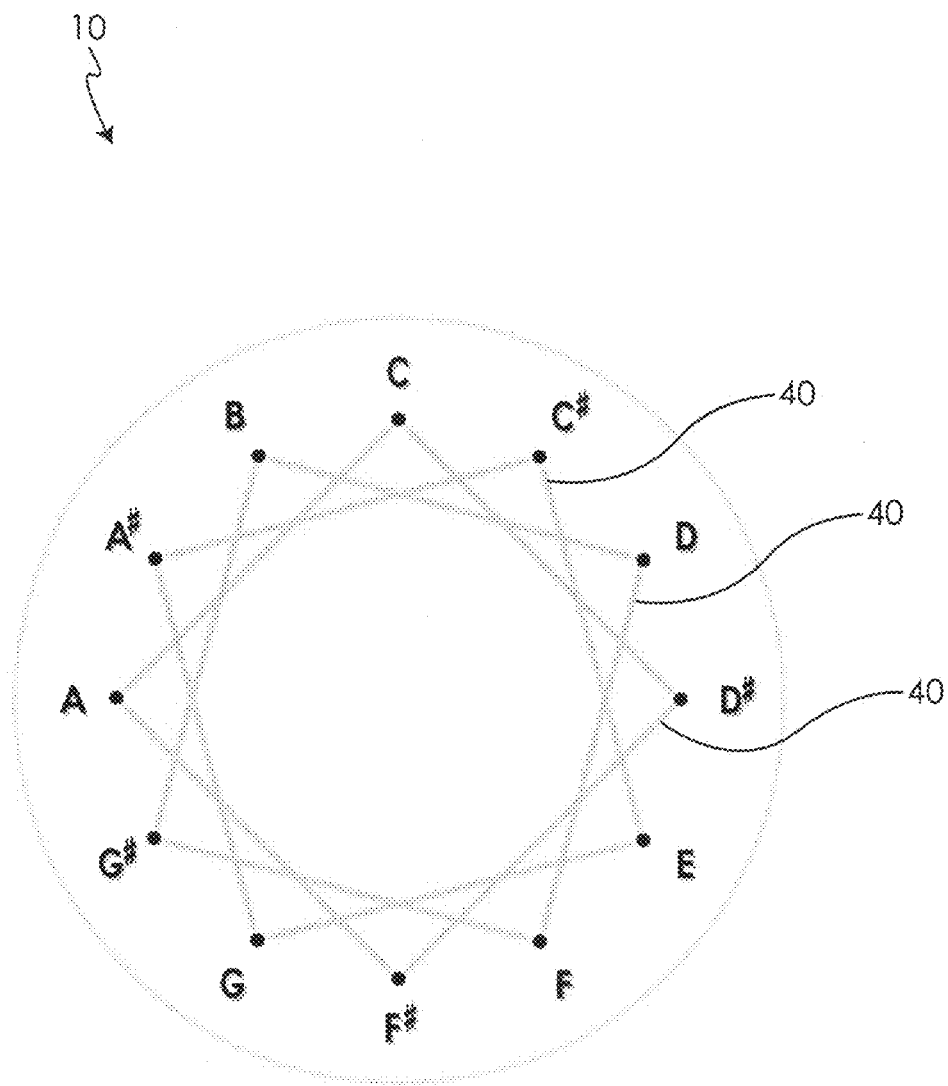
FIG. 4 is a diagram of a twelve-tone circle showing the first through third diminished scales.
Figure 5:
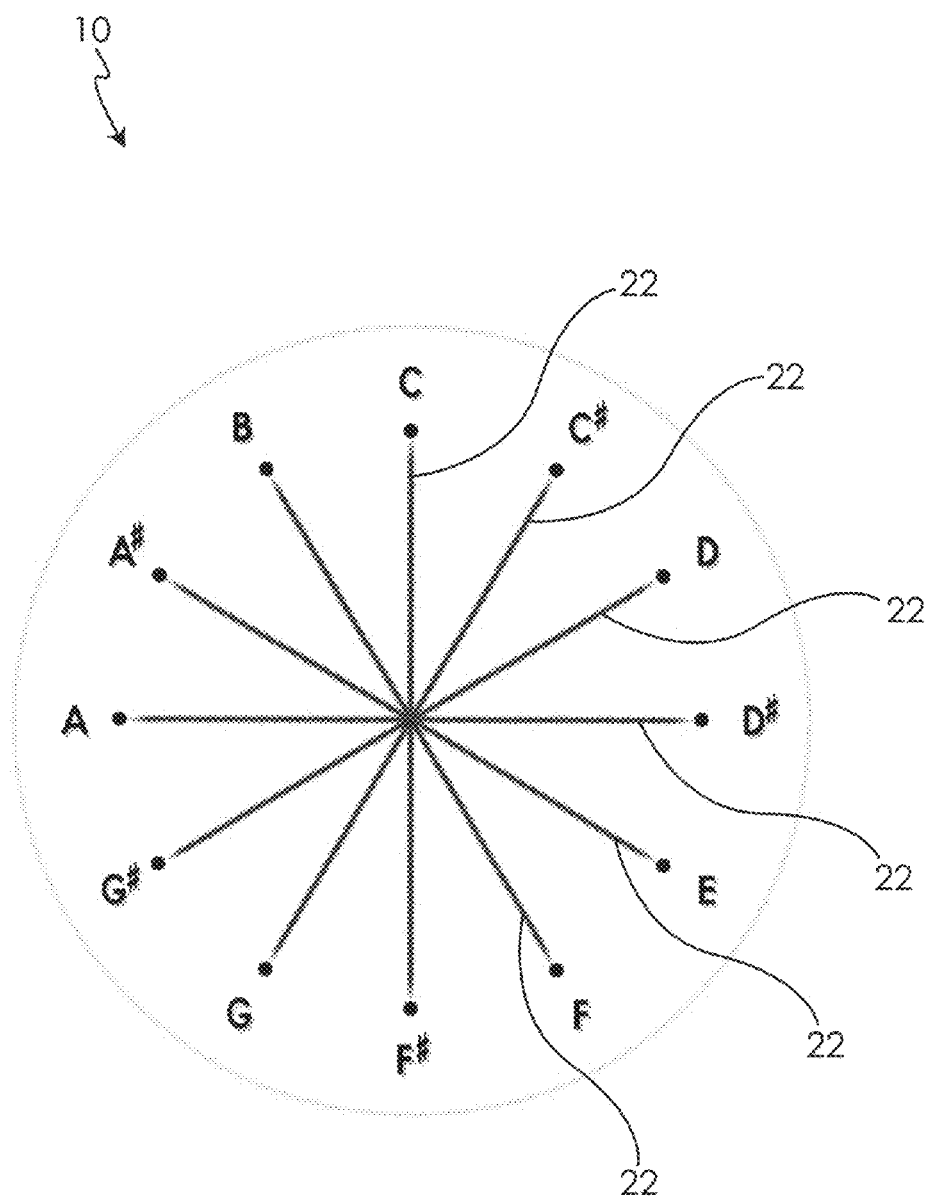
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
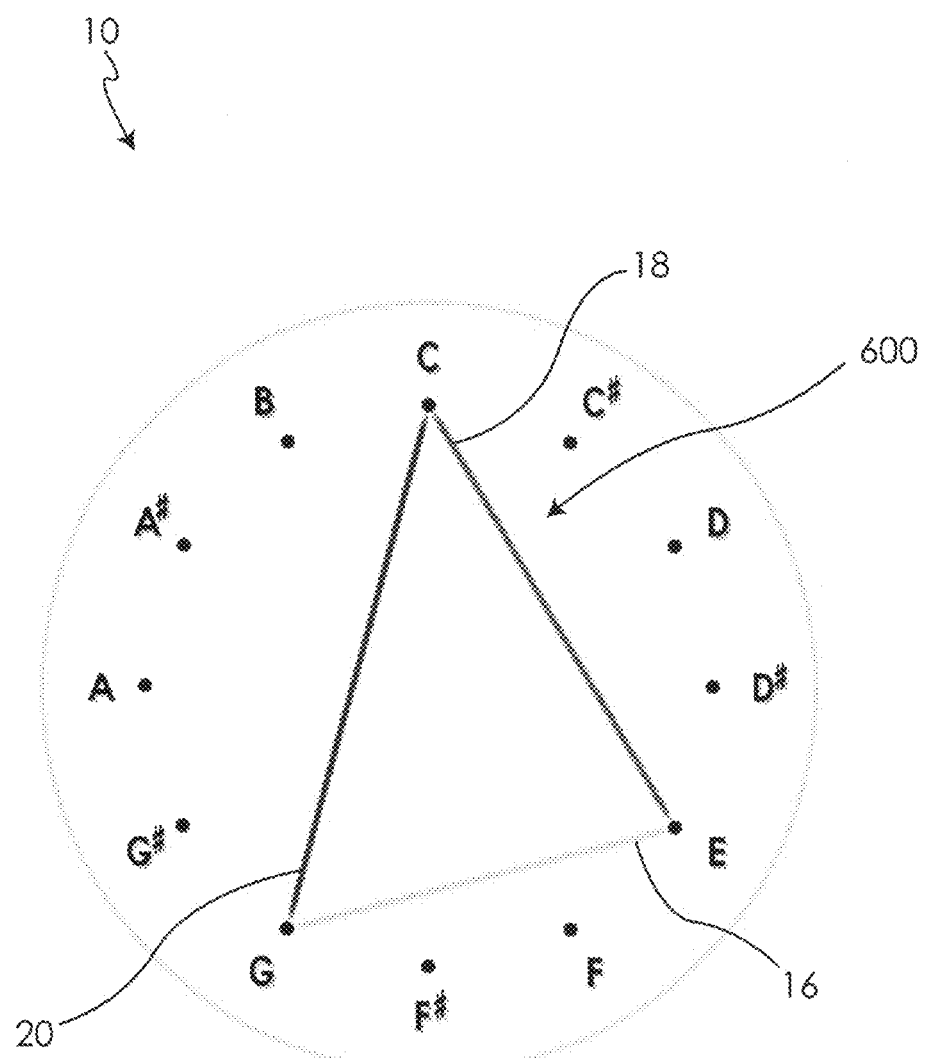
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
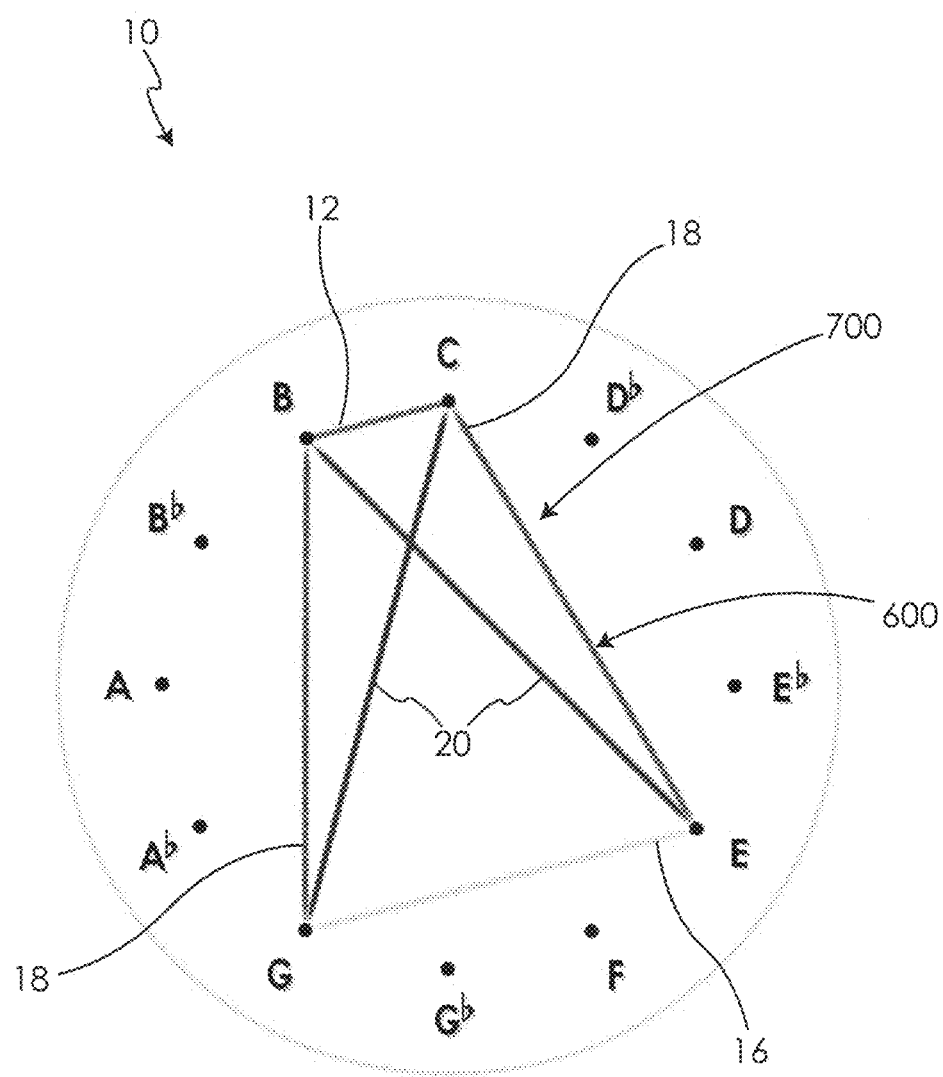
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
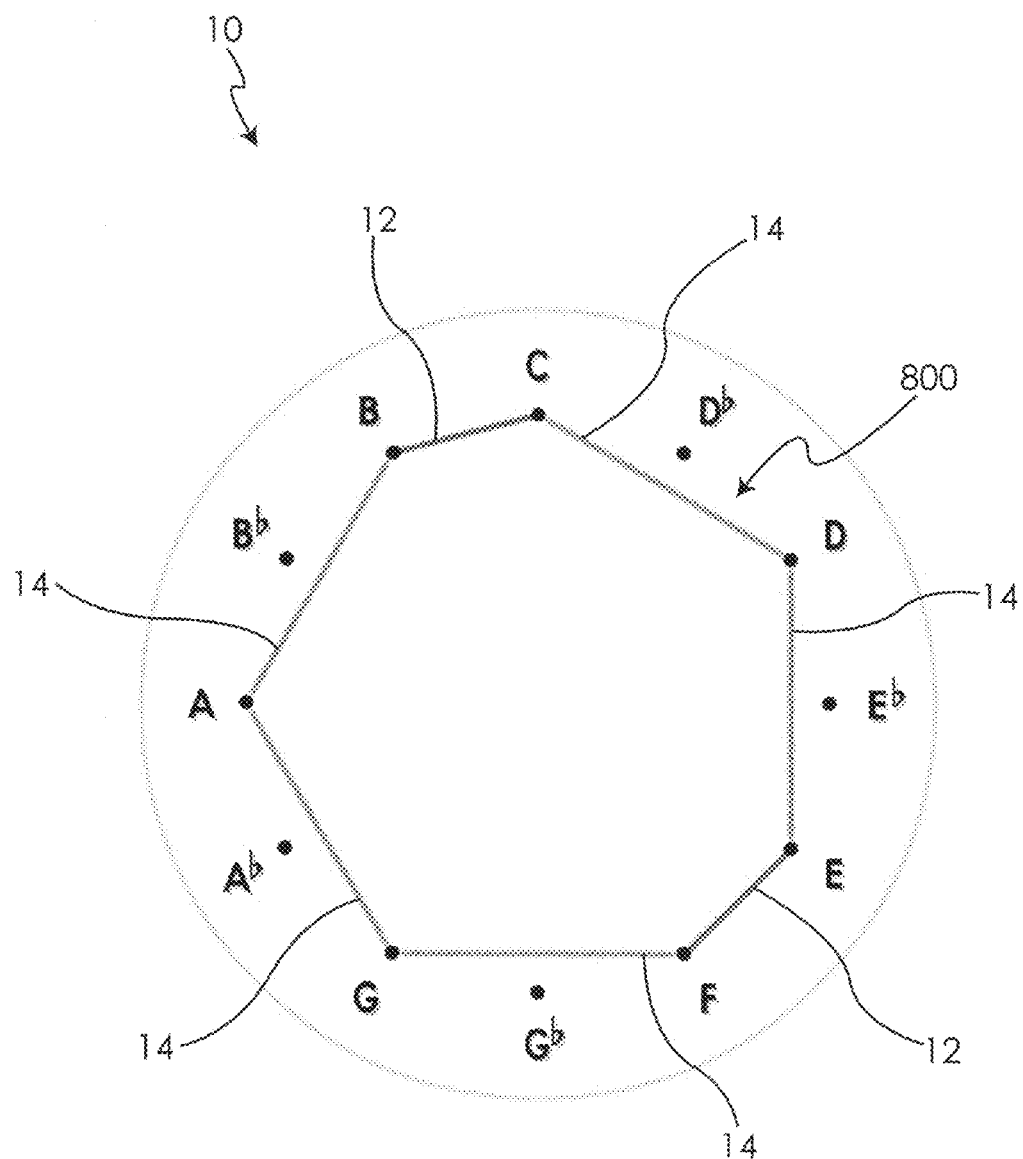
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
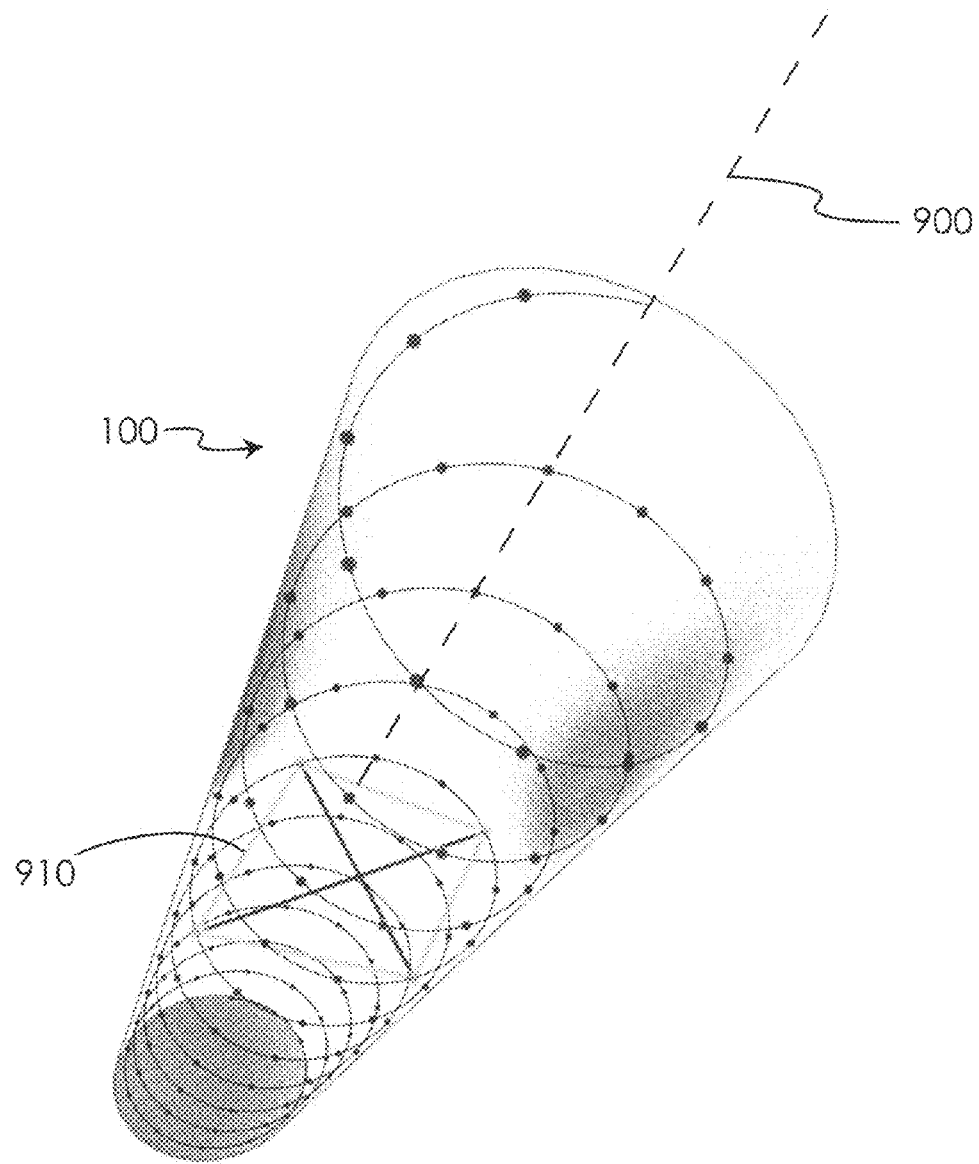
FIGS. 9-10 are diagrams of a helix showing a B diminished seventh chord.
Figure 10:
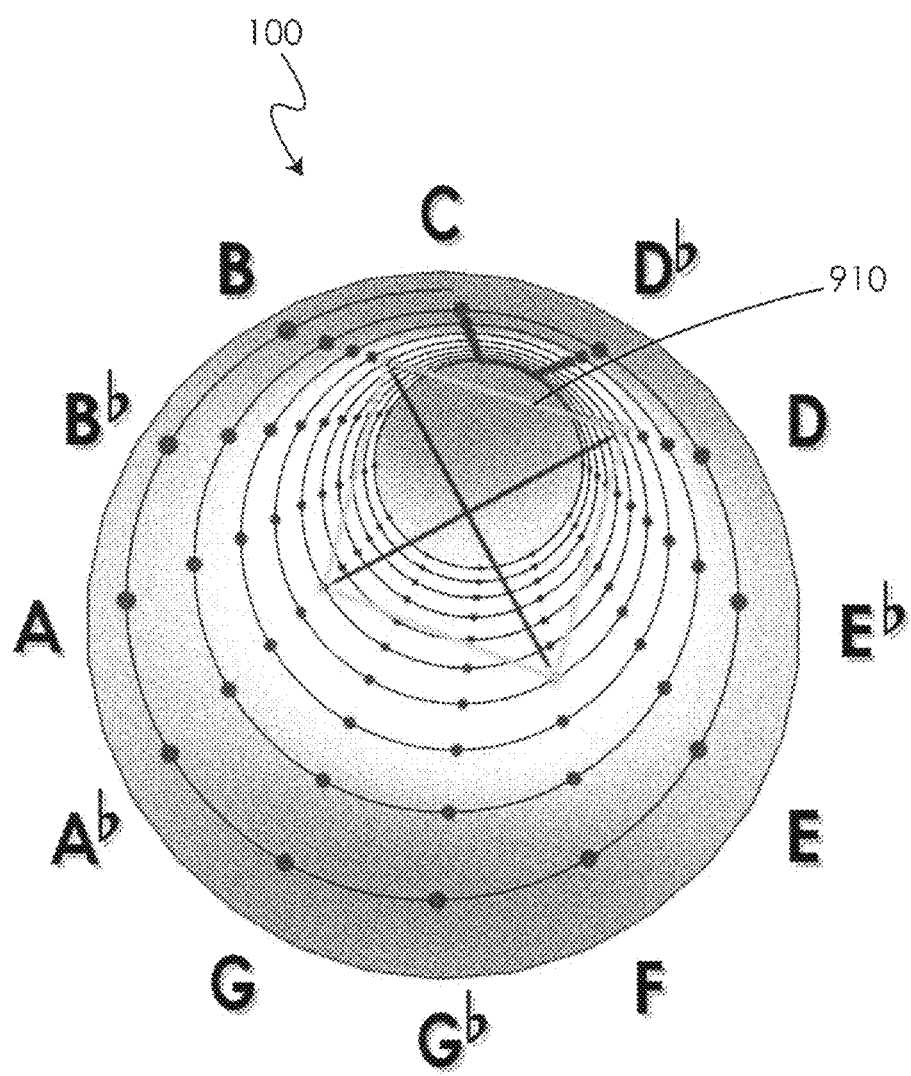

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
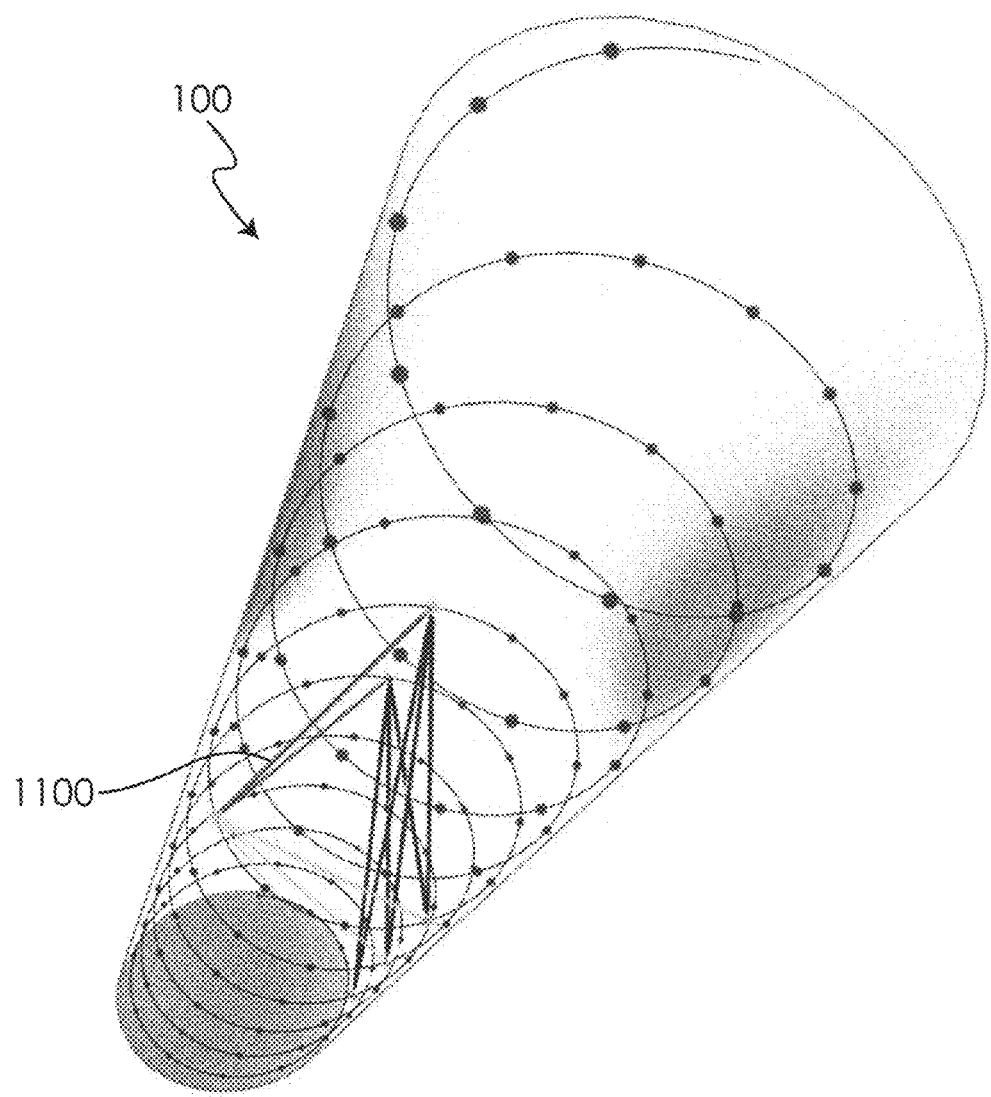
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 filed Jan. 31, 2008 entitled "Device and Method for Visualizing Musical Rhythmic Structures" which is also hereby incorporated by reference in its entirety.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
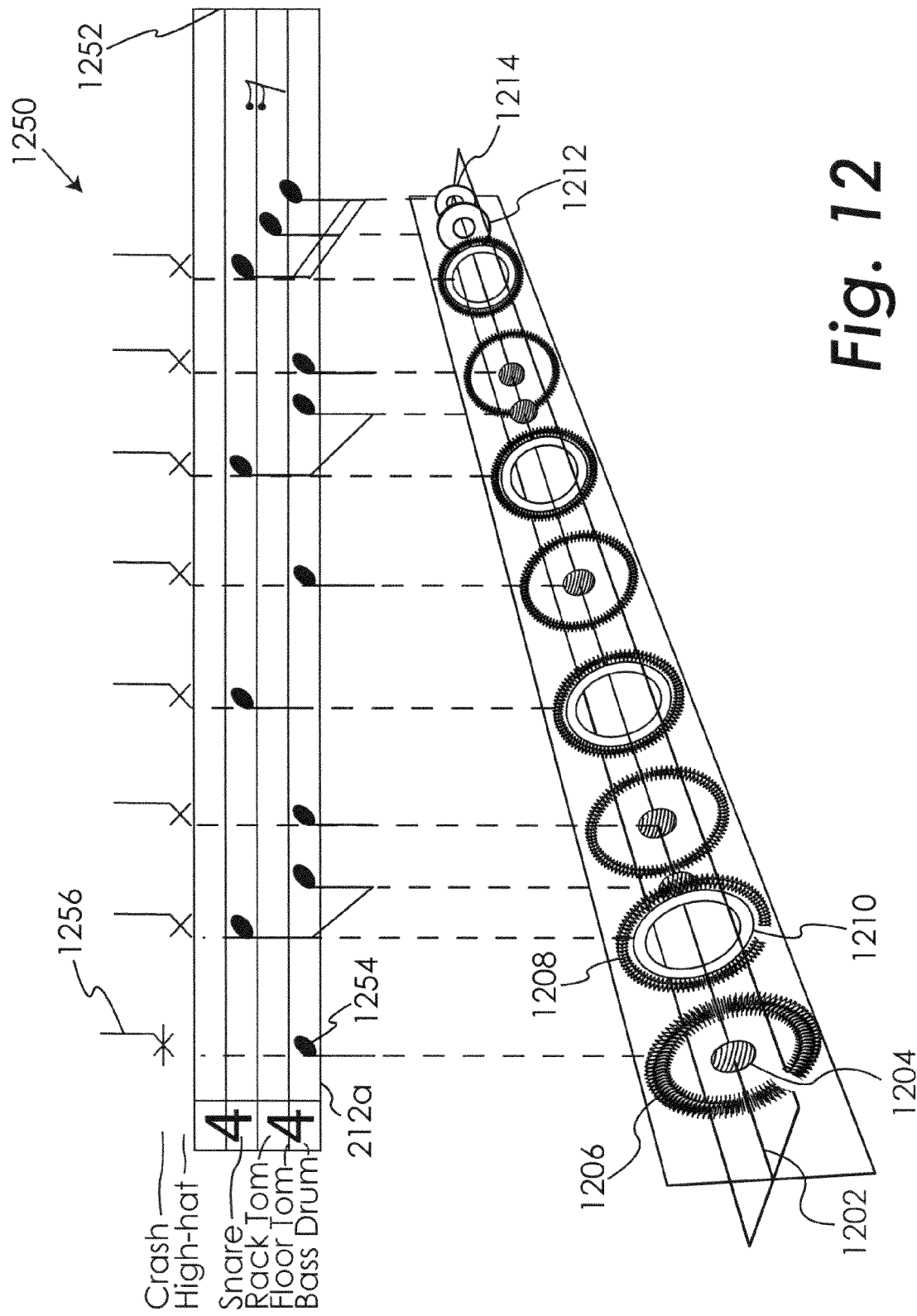
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
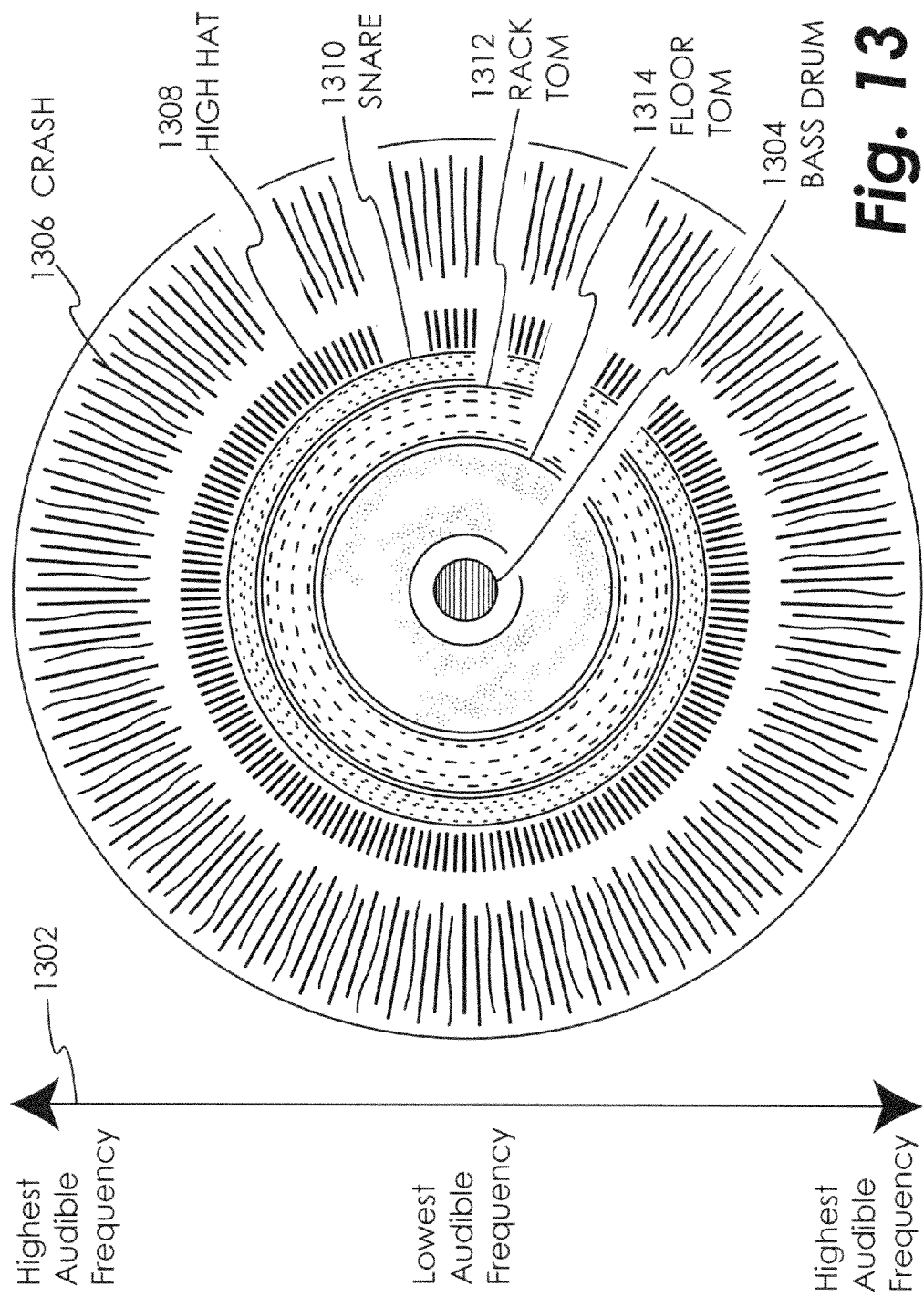
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
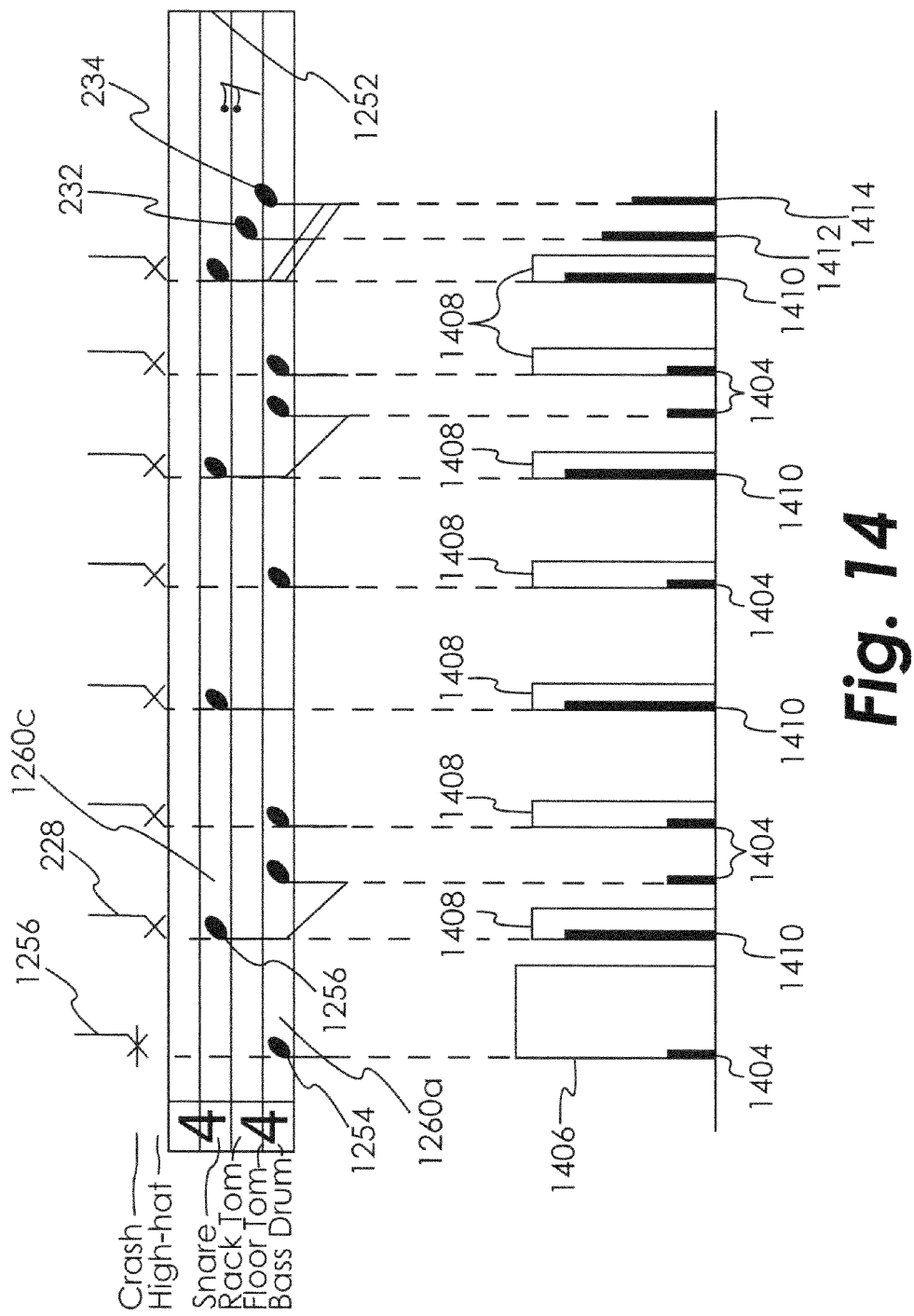
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar

1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260a of staff 1252. Likewise, bar 1410 (representing the snare drum) will be converted to a note 1256 in the second highest space 1260c of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

The present disclosure utilizes the previously described visualization methods as the basis for a system of identity verification. The system can be used to distinguish between different individuals based upon their vocal characteristics and speech patterns. A means for encoding identity information on a credit or other personal card is optionally provided so that the proper card holder's identity can be verified when using the card to purchase goods or services.

Figure 15:
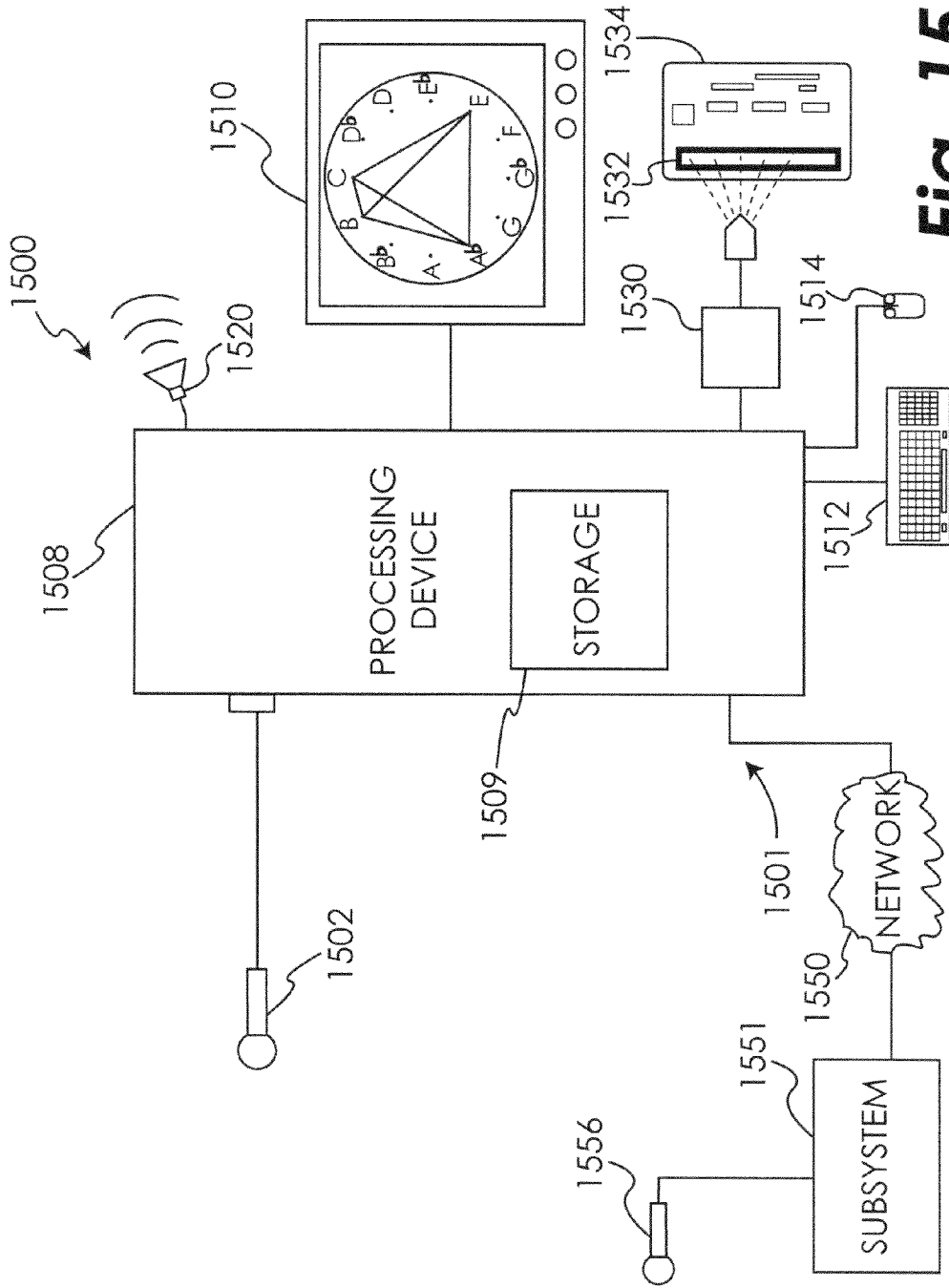
FIG. 15 is a schematic block diagram showing an identity verification system according to one embodiment.

FIG. 15 shows, in schematic form, one embodiment of an identity verification system 1500 according to the present disclosure. It is understood that one or more of the functions described herein may be implemented as either hardware or software, and the manner in which any feature or function is described does not limit such implementation only to the manner or particular embodiment described. The system 1500 may include a subsystem 1501 comprising a sound input device 1502, e.g., a microphone, a processing device 1508, data storage device 1509, a display 1510, user input devices such as keyboard 1512 and mouse 1514, a speaker 1520 and a card production device 1530. These devices are coupled to allow the input of sensed sounds into the processing device so that the visual representations of the sounds may be processed, evaluated, displayed, printed and/or manipulated by users.

The processing device 1508 may be implemented on a personal computer, a workstation computer, a laptop computer, a palmtop computer, a wireless terminal having computing capabilities (such as a cell phone having a Windows CE or Palm operating system), a dedicated embedded processing system, or the like. It will be apparent to those of ordinary skill in the art that other computer system architectures may also be employed.

In general, such a processing device 1508, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 1510 is coupled to the bus for displaying information for a computer user and the input devices 1512, 1514 are coupled to the bus for communicating information and command selections to the processor. A mass storage interface for communicating with data storage device 1509 containing digital information may also be included in processing device 1508 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display 1510 may be a liquid crystal device (LCD), a cathode ray tube (CRT), a plasma monitor, a holographic display, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 1509 may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device 1509 using the mass storage interface and downloads this information into random access memory for execution. The processor then executes an instruction stream from random access memory or read-only memory. Command selections and information that is input at input devices 1512, 1514 are used to direct the flow of instructions executed by the processor. Equivalent input devices 1514 may also be a pointing device such as a conventional trackball device. The results of this processing execution are then displayed on display device 1510.

The processing device 1508 is configured to generate an output for viewing on the display 1510. Preferably, the video output to display 1510 is also a graphical user interface, allowing the user to interact with the displayed information.

The system 1500 may optionally include a remote subsystem 1551 substantially similar to system 1500 and communicating with processing device 1508 via a network 1550, such as a LAN, WAN or the internet. Remote subsystem 1551 may be configured to act as a web server, a client or both and will preferably be browser enabled. Thus with remote subsystem 1551, remote identity verification is made possible.

In operation, system 1500 illustratively receives the names of individuals desiring the issuance of a secure credit or other type of card, e.g., a building access card, implemented in accordance with this disclosure. In order to receive a card prepared by system 1500, however, the applicant must provide a voice sample, e.g., their name or a standard reference phrase. Typically a card applicant would present themselves at a financial institution so that their identity at the time they provide the voice sample could be verified. Voice samples of applicants are applied to processing device 1508 via sound input device 1502, e.g., a microphone or a CD recording, or via a file transferred from a participating financial institution via network 1550. Processing device 1508 creates tonal and rhythm visualization components from the voice sample signals. These visualization components are represented as a two or three-dimensional shape as described above, and they contain information relating to various vocal characteristics, including pitch, timbre, phase and/or volume, as non-limiting examples.

In order to visualize the individual frequencies of input sounds, the system 1500 can implement software operating as an audio signal or note extractor. The audio extractor examines the signals received by the sound input device 1502 and determines which primary frequencies are present. The frequency content is then mapped to certain colors and positions within a tonal circle or helix and displayed to the user. Various methods are known in the art for determining the frequency of an input signal including, but not limited to, frequency counters and band pass filters. Certain audio frequency extraction methods are also described in U.S. Patent Application Ser. No. 61/025,374 filed Feb. 1, 2008 entitled "Apparatus and Method for Visualization of Music Using Note Extraction" which is hereby incorporated by reference in its entirety.

The visualization components related to each voice sample are illustratively encoded and stored in data storage unit 1509 and provided to card production device 1530. In one embodiment, card production device 1530 illustratively encodes the voice sample visualization components as a two-dimensional image 1532, e.g., using known techniques for printing on cards or by creating the visualization as a hologram, which is then printed directly on cards 1534 as they are processed by card production device 1530. The image 1532 may comprise an actual visualization graphic according to the method disclosed herein, or in other embodiments may contain encoded information, e.g. stored in a printed bar code or on a magnetic strip, sufficient for a reading device to recreate the visualization for display to a cashier or security officer for verification. In other embodiments, the image 1532 may simply comprise an encoded identifier which can be used by a reading device to retrieve the actual visualization information from a library on data storage unit 1509. In other embodiments, the voice sample visualization components may be encoded and stored as a digital file in a smart card format.

When the holder of a card 1534 produced in accordance with the operation of system 1500 attempts to use card 1534 for a transaction or to gain access to a secured location, for example, the card holder will be asked to speak his or her name into a sound input device 1556 connected to subsystem 1551, as well as optionally allowing his or her card to be "read" by a card reading device contained within subsystem 1551 to obtain the information encoded in image 1532, for example. Subsystem 1551, which incorporates a processing device operating similarly to processing device 1508, illustratively decodes the image 1532 information and compares the visualization components associated with card 1534 to the visualization components from the voice sample given by the holder. If the visualization components match, the transaction is allowed to proceed. If the visualization components don't match, the transaction is terminated and security personnel are called to apprehend the alleged owner of card 1534. Alternatively, subsystem 1551 may transmit the voice sample from the card holder as well as the card identity (e.g., voice) information to processing device 1508 via network 1550 for creation and comparison of the voice visualization components to a voice library stored on data storage unit 1509.

In certain embodiments, the system 1500 will provide visualizations for both the received voice sample and the voice sample associated with card 1534 (e.g. by superimposing the two visualizations) on the display 1510. This allows a human operator to visually compare the two samples to determine if there is a match. In the case of complex sounds like spoken words, human decision making may be more accurate, particularly when the operator has the assistance of the visualization techniques disclosed herein.

Figure 16:
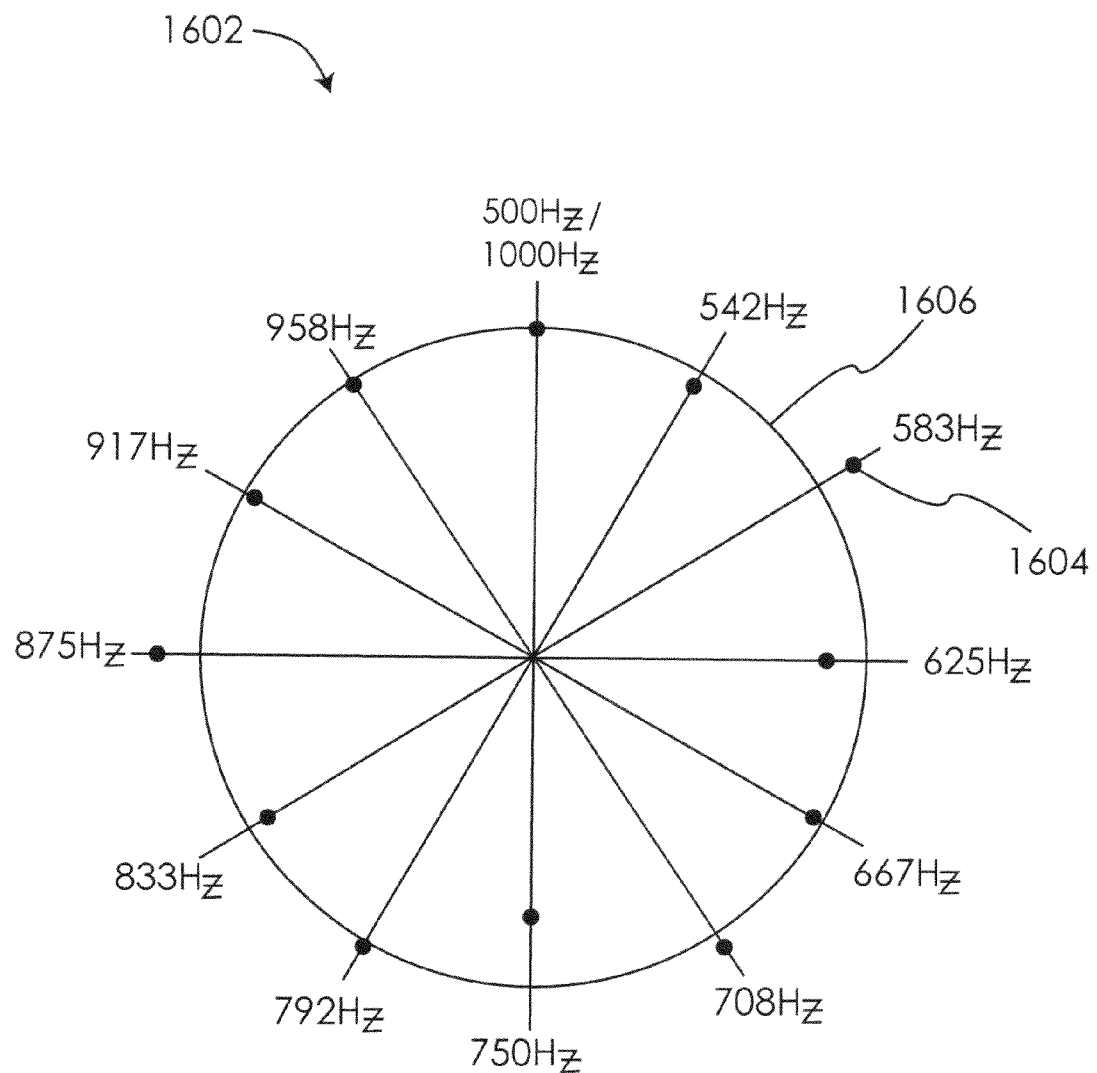
FIG. 16 depicts a visual representation of an individual person's speech according to one embodiment.

FIG. 16 depicts one embodiment where visualization 1602 is generated based on a person's voice, with the circle 1606 divided into an equal number of frequency intervals within a desired ranged (in this case, 500 Hz to 1000 Hz). The radial position of each of the indicators 1604 corresponds to the relative amplitude of the person's voice at that frequency as the word or phrase is spoken. By observing the amplitudes at the various frequencies, a human operator or the automated processing software can distinguish the identity of the true card holder from that of an imposter. In addition to a single circle format, the visualization can be translated to helical form in order to display a multi-octave range of frequencies.

Figure 17:
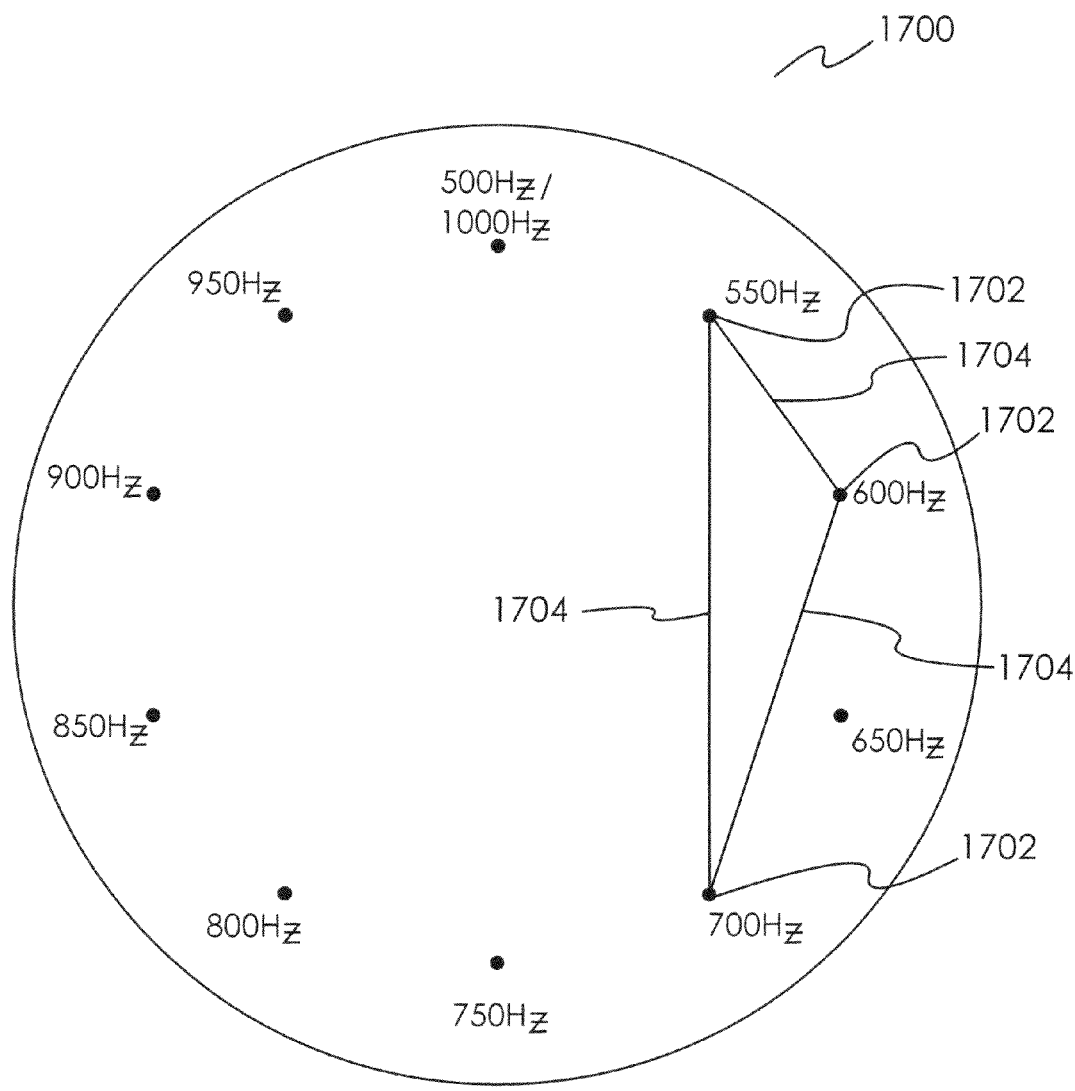
FIG. 17 depicts a visual representation of an individual person's speech according to another embodiment.

FIG. 17 shows an example of a visualization 1700 wherein lines 1704 connect points 1702 which represent the primary vocal frequency sensed for each syllable in a spoken word. FIG. 17 displays the octave range from 500 Hz to 1000 Hz (one of the octaves within the human speech range), however it will be understood that any desired range can be used. In addition, the visualization can be translated to helical form in order to display a multi-octave range of frequencies. The lines 1704 may also incorporate color as described hereinabove to further visualize the individual's vocal characteristics. In certain embodiments, the position and length of a line 1704 can represent pitch, with the color of the line 1704 representing the duration of time between tonal transitions. As another non-limiting example, the color of lines 1704 can correspond to the amplitude of each spoken syllable. In that way, particular vocal intonations, such as words spoken with an accent, can be identified in the encoded visualization signal information and easily compared to vocal characteristic information associated with the true card owner.

In addition to tonal visualization, the rhythm visualizations described hereinabove can be utilized to convey the rhythmic characteristics of a person's voice when speaking a word or phrase. Instead of corresponding to a musical instrument, however, the visualizations can follow a more generalized format in which lower frequency sounds, like the "b" syllable, are displayed as structures with a smaller diameter (much like a bass drum) and higher frequency sounds, like an "s" syllable, are displayed as structures with higher diameters (much like a cymbal), to give just one non-limiting example. These rhythmic visualizations can provide an additional basis by which a human operator or the automated processing software can evaluate the various sensed sounds.

It can be seen that the previously described tonal and rhythm visualization systems can provide a cost effective way to implement an accurate, reliable, and secure identity verification system that has broad application for individuals as well as companies over a wide range of different industries. While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the disclosure provided herein are desired to be protected. The articles a, an, "said," and "the" are not limited to a singular element, and may include one or more such elements.

What is claimed:

1. An identity verification system, comprising:
   a sound input device;
   a processing device operatively coupled to said sound input device; and
   a display operatively coupled to said processing device;
   wherein:
   said processing device executes computer readable code to create a first visual representation of frequency relationships within a spoken word sensed by the sound input device for output on the display;
   wherein:
   said first visual representation is evaluated to determine the identity of the person speaking said spoken word; and
   wherein:
   said first visual representation is generated according to a method comprising the steps of:
   (a) placing twelve labels in a pattern of a circle, said twelve labels corresponding to twelve respective frequencies, such that moving clockwise or counter-clockwise between adjacent ones of said labels represents a first frequency interval;
   (b) identifying an occurrence of a first frequency within the spoken word;
   (c) identifying an occurrence of a second frequency within the spoken word;
   (d) identifying a first label corresponding to the first frequency;
   (e) identifying a second label corresponding to the second frequency;
   (f) creating a first line connecting the first label and the second label; and
   wherein:
   (1) the first line is a first color if the first frequency and the second frequency are separated by the first frequency interval;
   (2) the first line is a second color if the first frequency and the second frequency are separated by a first multiple of the first frequency interval;
   (3) the first line is a third color if the first frequency and the second frequency are separated by a second multiple of the first frequency interval;
   (4) the first line is a fourth color if the first frequency and the second frequency are separated by a third multiple of the first frequency interval;
   (5) the first line is a fifth color if the first frequency and the second frequency are separated by a fourth multiple of the first frequency interval; and
   (6) the first line is a sixth color if the first frequency and the second frequency are separated by a fifth multiple of the first frequency interval.

2. The system of claim 1, wherein step (a) further comprises arranging each of the twelve labels to be substantially evenly spaced from each adjacent label.

3. The system of claim 2, wherein step (a) further comprises arranging each of the twelve labels to be spaced 30 degrees from each adjacent label.

4. The system of claim 1, wherein the first color is red, the second color is orange, the third color is yellow, the fourth color is green, the fifth color is blue and the sixth color is purple.

5. The system of claim 1, wherein:
   the first color has a first wavelength that is larger than a second wavelength of the second color;
   the second wavelength is larger than a third wavelength of the third color;
   the third wavelength is larger than a fourth wavelength of the fourth color;
   the fourth wavelength is larger than a fifth wavelength of the fifth color; and
   the fifth wavelength is larger than an sixth wavelength of the sixth color.

6. The system of claim 1, wherein a second visual representation of frequency relationships within a previously recorded word is generated using said method, said second visual representation being displayed simultaneously on said display with said first visual representation.

7. The system of claim 6, wherein the brightness of said first line transitions from a relatively dimmer state to a relatively brighter state on said display when said first visual representation matches said second visual representation.

8. The method of claim 1, further comprising the steps of:
   (g) identifying an occurrence of a third frequency within said spoken word;
   (h) identifying a third label corresponding to the third frequency;
   (i) creating a second line connecting the second label and the third label; and
   (j) creating a third line connecting the third label and the first label.

9. An identity verification system, comprising:
   a sound input device;
   a processing device operatively coupled to said sound input device; and
   a display operatively coupled to said processing device;
   wherein:
   said processing device executes computer readable code to create a first visual representation of frequency relationships within a spoken word sensed by the sound input device for output on the display;

wherein:
said first visual representation is evaluated to determine the identity of the person speaking said spoken word; and
wherein:
said first visual representation is generated according to a method comprising the steps of:
(a) labeling the perimeter of a circle with a plurality of placing twelve labels in a pattern of a circle, said twelve labels corresponding to a plurality of equally spaced frequency intervals twelve respective frequencies in an octave, such that moving clockwise or counter-clockwise between adjacent ones of said labels represents a first frequency interval;
(b) identifying an occurrence of a first frequency within the spoken word;
(c) identifying an occurrence of a second frequency within the spoken word;
(d) identifying a first label corresponding to the first frequency;
(e) identifying a second label corresponding to the second frequency;
(f) creating a first line connecting the first label and the second label, wherein:
(1) the first line is a mixture of a first color and a second color if the first frequency and the second frequency are separated by more than the first frequency interval and less than a first multiple of the first frequency interval;
(2) the first line is a mixture of a second color and a third color if the first frequency and the second frequency are separated by more than the first multiple of the first frequency interval and less than a second multiple of the first frequency interval;
(3) the first line is a mixture of a third color and a fourth color if the first frequency and the second frequency are separated by more than the second multiple of the first frequency interval and less than a third multiple of the first frequency interval;
(4) the first line is a mixture of a fourth color and a fifth color if the first frequency and the second frequency are separated by more than the third multiple of the first frequency interval and less than a fourth multiple of the first frequency interval;
(5) the first line is a mixture of a fifth color and a sixth color if the first frequency and the second frequency are separated by more than the fourth multiple of the first frequency interval and less than a fifth multiple of the first frequency interval.

10. The system of claim 9, wherein the first color is red, the second color is orange, the third color is yellow, the fourth color is green, the fifth color is blue and the sixth color is purple.

11. The system of claim 9, wherein:
the first color has a first wavelength that is larger than a second wavelength of the second color;
the second wavelength is larger than a third wavelength of the third color;
the third wavelength is larger than a fourth wavelength of the fourth color;
the fourth wavelength is larger than a fifth wavelength of the fifth color; and
the fifth wavelength is larger than an sixth wavelength of the sixth color.

12. The system of claim 9, wherein a second visual representation of frequency relationships within a previously recorded word is generated using said method, said second visual representation being displayed simultaneously on said display with said first visual representation.

13. The system of claim 12, wherein the brightness of said first line transitions from a relatively dimmer state to a relatively brighter state on said display when said first visual representation matches said second visual representation.

14. The method of claim 9, further comprising the steps of:
(g) identifying an occurrence of a third frequency within said spoken word;
(h) identifying a third label corresponding to the third frequency;
(i) creating a second line connecting the second label and the third label; and
(j) creating a third line connecting the third label and the first label.

* * * * *